United States Patent [19]

Roth et al.

[11] 4,129,447

[45] Dec. 12, 1978

[54] PROCESS FOR THE PREPARATION OF HYDROPHOBIC AGENTS

[75] Inventors: Michael Roth; Konrad Gogolok, both of Burghausen, Germany

[73] Assignee: Wacker-Chemie GmbH, Munich, Germany

[21] Appl. No.: 766,110

[22] Filed: Feb. 7, 1977

[30] Foreign Application Priority Data

Feb. 17, 1976 [DE] Fed. Rep. of Germany ....... 2606273

[51] Int. Cl.² .............................................. C09D 5/20
[52] U.S. Cl. .......................................... 106/2; 106/90; 106/98; 106/119; 106/287.13
[58] Field of Search .................... 106/2, 287 SB, 119, 106/287.13

[56] References Cited

U.S. PATENT DOCUMENTS 3,198,747  8/1965  Cook et al. ..................... 106/287 SB

FOREIGN PATENT DOCUMENTS 1217813  12/1970  United Kingdom.

Primary Examiner—Lorenzo B. Hayes

[57] ABSTRACT

A process for preparing hydrophobic agents which comprises slaking caustic lime with water containing a protective colloid, a salt of an acid having the formula $R(O)_aSO_3H$ in which R is selected from the group consisting of substituted or unsubstituted monovalent hydrocarbon radicals and a is 0 or 1 and an organopolysiloxane emulsion having on the average 0.8 to 1.8 SiC-bonded hydrocarbon radicals per silicon atom.

5 Claims, No Drawings

PROCESS FOR THE PREPARATION OF HYDROPHOBIC AGENTS

The present invention relates to hydrophobic agents, particularly to hydrophobic agents which are combined with inorganic binding agents prior to molding and more particularly to a process for preparing hydrophobic agents by the reaction of organopolysiloxanes with basic calcium compounds. These hydrophobic agents are added to inorganic binding agents prior to molding.

Various inorganic materials have been rendered water repellent by either applying hydrophobic agents to the surface of molded objects or by adding the hydrophobic agents to compositions containing or consisting of inorganic binding materials prior to the molding process.

Compared to the application of hydrophobic agents to finished molded objects or the coating of finished molded objects, the mixing of compositions containing or consisting of inorganic binding agents with the hydrophobic agents prior to molding, has the advantage that it is possible to produce molded objects and coatings which are not only hydrophobic on their surfaces, but are hydrophobic throughout. This means that if any cracks should later occur in the molded objects or coatings, they will still be hydrophobic. Moreover, mixing the hydrophobic agents with the inorganic binding agents prior to molding requires considerably less labor and equipment.

Among the known hydrophobic agents which are added prior to molding are compositions containing or consisting of aqueous organopolysiloxane emulsions, hydrated pastes obtained from the reaction of organohalosilanes with aqueous calcium hydroxide powders which are obtained by the hydrolysis of organotrichlorosilanes as well as metal salts of higher fatty acids. The aqueous organopolysiloxane emulsions and the hydrated pastes described above have the disadvantage that they can be added to the compositions which contain the inorganic binding agents just prior to use, or they require a drying process when they are to be added and then stored prior to use. Another disadvantage is that greater expenditures for their storage and transportation are required due to their water content. The addition of hydrophobic agents to compositions containing inorganic binding agents or consisting of such binding agents just prior to use, increases the probability of mistakes and often does not guarantee the homogeneous mixing of the compositions with the hydrophobic agents. Because they are difficult to wet, powders which have been obtained by hydrolyzing organotrichlorosilanes can often only be dispersed with difficulty, during or following the addition of water, in the compositions containing or consisting of inorganic binding agents and thus, water repellency achieved with these powders is often very low.

When metal salts of higher fatty acids are employed it can often be observed that before or following the molding of the compositions containing or consisting of inorganic binding agents, the higher fatty acid metal salts float on the surface of the water containing compositions and are not uniformly dispersed. Furthermore, these soaps are biologically degraded by weather conditions and thus rendered ineffective within a relatively short time.

German Patent Application No. 1,769,508, French Pat. No. 2,010,092 and British Pat. No. 1,217,813, to Wacker-Chemie GmbH, disclose a process which permits the preparation of powdery hydrophobic agents which can be added to compositions consisting of or containing inorganic binding agents prior to molding and which are free of all of the previously mentioned disadvantages. In this process hydrophobic agents are prepared by slaking caustic lime in water with an organopolysiloxane emulsion containing on the average 0.8 to 1.8 SiC-bonded hydrocarbon radicals for each silicon atom and if the products thus obtained are not in a powder form, they are dried and ground.

These references also disclose that dispersing agents such as protective colloids, cation active emulsifiers, anion-active emulsifiers and non-ionic emulsifiers may be employed in the preparation of the aqueous organopolysiloxane emulsions. Examples of various dispersing agents are sodium isopropyl naphthalene sulfonate, sodium dioctylsulfosuccinate, sodium laurylsulfate, and the like. Moreover, the references disclose that mixtures of various dispersing agents may be employed, if desired. A protective colloid such as polyvinyl alcohol, may be used exclusively as a dispersing agent since it permits the preparation of particularly stable emulsions.

Compared to the hydrophobic agents described heretofore which are added to compositions containing or consisting of inorganic binding agents prior to the molding process, the hydrophobic agents of this invention offer certain advantages. For example, they can be added to compositions containing or consisting of inorganic binding agents or to additives which are incorporated in the compositions, such as for example pigments, a long time before they are added to the compositions or, if desired, they can easily be added immediately before and/or simultaneously with and/or following the addition of water. Also, they can be uniformly dispersed in compositions containing the inorganic binding agents without any danger of demulsification. Furthermore, the molded objects and coatings thus prepared are considerably more water repellent than molded objects and coatings prepared using the hydrophobic agents described in the prior art, such as for example finely dispersed methylpolysiloxanes. Still another advantage of the hydrophobic agents prepared in accordance with this invention is that they are more readily available, than for example finely dispersed methylpolysiloxanes. Furthermore, the hydrophobic agents of this invention can be easily wetted with water, but surprisingly provide molded objects and coatings having a greater degree of water repellency than the hydrophobic agents known heretofore.

Therefore it is an object of this invention to provide hydrophobic agents which may be combined with inorganic binding agents prior to molding. Another object of this invention is to provide hydrophobic agents which may be added to compositions containing inorganic binding agents prior to their contemplated use. Another object of this invention is to provide hydrophobic agents which are easily added to compositions before and/or simultaneously with and/or following the addition of water. Still another object of this invention is to provide hydrophobic agents which can be added to aqueous emulsions without "breaking" the emulsions. A further object of this invention is to provide hydrophobic agents which are easily wetted with water. A still further object of this invention is to provide a process for preparing hydrophobic agents which can be combined with inorganic binding agents to impart improved water repellency to objects molded therefrom.

The foregoing objects and others which will become apparent from the following description are accomplished in accordance with this invention, generally speaking, by providing a composition containing organopolysiloxanes and a basic calcium compound in which caustic lime is slaked in water containing a protective colloid, an organopolysiloxane emulsion having on the average of from 0.8 to 1.8 SiC-bonded hydrocarbon radicals per silicon atom, and at least one salt of an acid having the general formula R(O)$_a$SO$_3$H, in which R represents a substituted and an unsubstituted monovalent hydrocarbon radical and a is 0 or 1. When the resultant product is not in the form of a powder, then it is dried and ground if necessary.

The caustic lime (CaO) sometimes referred to as "burnt lime" or "calcium oxide" can be used as fine or coarse particles of lime. In order to facilitate the mixing of the organopolysiloxane emulsion with the caustic lime and because this results in a particularly finely dispersed hydrophobic medium, the use of fine lime, i.e. powdered caustic lime, is preferred.

The SiC-bonded hydrocarbon radicals of the organopolysiloxanes employed in the emulsions of this invention may consist of alkyl, alkenyl, cycloalkyl, cycloalkenyl, aryl, aralkyl, or alkaryl radicals. It is preferred that the alkyl radicals have from 1 to 16 carbon atoms. Examples of suitable alkyl radicals are methyl, ethyl, n-propyl, isopropyl or n-butyl radicals as well as octyl radicals. Methyl and phenyl radicals are the preferred hydrocarbon radicals. In addition to the SiC-bonded hydrocarbon radicals and of course in addition to siloxane hydrogen atoms, the organopolysiloxanes may also contain additional groups or Si-bonded atoms. Such additional groups are particularly Si-bonded hydroxyl groups which are preferably present in amounts of on the average no more than 1.7 of such groups for each Si-atom, and/or alkoxy groups, especially those having from 1 to 4 carbon atoms per group, preferably methoxy or ethoxy groups which are preferably also present in amounts of on the average of no more than 1.7 of such groups for each Si-atom. Examples of Si-bonded atoms other than the carbon atoms in the SiC bond and siloxane oxygen atoms, are particularly Si-bonded hydrogen atoms which should preferably be present in an amount of on the average of no more than about 1.25 such atoms for each Si-atom. Mixtures of various organopolysiloxanes can be employed. One of the advantages of the process of this invention is that it permits the use of hydrolysates of organopolysiloxanes whose boiling points are above 70° C. and particularly between 100° C. and 150° C. at 760 mm Hg (abs) and products which are obtained from the reaction of methylchloride with silicon that are obtained from the direct synthesis of methylchlorosilanes.

The viscosity of the organopolysiloxanes which are used in the preparation of the emulsions of this invention, should preferably not exceed about 100,000 cSt, as measured in a 50 percent by weight toluene solution at 25° C.

The organopolysiloxanes are preferably used in amounts of from 10 to 150 percent by weight based on the weight of the caustic lime.

The organopolysiloxane emulsions employed in the process of this invention are well known and their preparation in water with the aid of protective colloids is well known in the art.

Examples of suitable protective colloids are polyvinyl alcohol which may contain up to 40 mol percent of non-saponified acyl groups such as acetyl groups or acyl groups which are derived from so-called "Koch aids", gelatin and cellulose derivatives, for example water soluble methylcellulose. Mixtures of various protective colloids may be used. The protective colloids are preferably used in amounts of from 0.1 to 5 percent by weight based on the weight of the organopolysiloxanes.

In the preparation of the organopolysiloxane emulsions employed in this invention, the organopolysiloxanes can be used in the absence of a solvent or in the form of solutions in organic solvents which are liquid at a temperature of 20° C. at 760 mm Hg (abs). Examples of suitable solvents are aliphatic hydrocarbons such as alkanes having a boiling point in the range of from 120° C. to 180° C. at 760 mm HG (abs), aromatic hydrocarbons such as toluene, xylene and trimethylbenzene; chlorinated hydrocarbons such as trichloroethylene; alcohols such as isopropyl alcohol and diacetone alcohol; esters such as ethyl acetate; ethers such as n-dibutyl ether and ketones such as methyl ethyl ketone. Mixtures of various solvents can be employed as well. If the organopolysiloxanes are used in the form of solutions in organic solvents, it is preferred that the solutions contain from 25 to 100 percent by weight of solvent based on the weight of the organopolysiloxanes.

The amount of water based on the weight of the emulsion is not critical. However, it is essential that during the slaking of the caustic lime with the aqueous organopolysiloxane emulsion, that at least 1 mol of water for each mol of CaO be present in order to insure that the caustic lime is completely slaked. It is preferred that the amount of free water not exceed about 10 percent of that which is required to obtain lime which has been slaked with the organopolysiloxane emulsion. If more water is used, then not enough water evaporates due to the heat of hydration of the caustic lime and/or not enough water is bonded as hydrated water to obtain a powdered product. It then becomes necessary to remove at least the free water which is in excess of the 10 percent by weight by drying the product obtained subsequent to the slaking of the lime. Drying can be achieved not only by heating, but also for example by adding to the slaked lime suitable dehydrating agents, such as silica gel.

Among the salts of acids having the general formula

R(O)$_a$SO$_3$H, in which R is a monovalent radical having up to 50 carbon atoms and also contains hydrogen, oxygen and nitrogen atoms and a is the same as above, which can be used in the hydrophobic agents of this invention are those acids in which a is preferably 1. Thus salts of acid esters of sulfuric acid are preferred.

Examples of acid esters of sulfuric acid from which these salts can be derived, are compounds of the general formulae:

$$R^1-\underset{\underset{OSO_3H}{|}}{CH}-(CH_2)_n-COOH$$

-continued

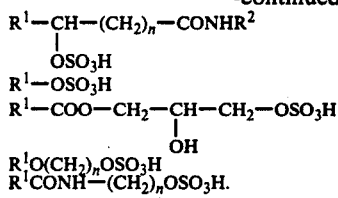

Examples of other salts which can be used are those of acids of the following formulae:

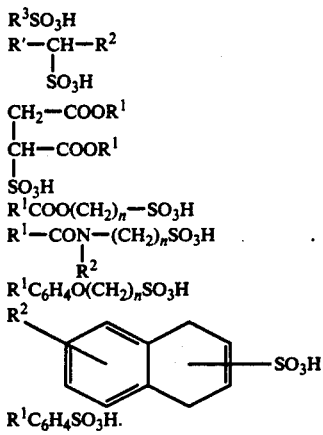

$R^1C_6H_4SO_3H.$

In the preceding formulae $R^1$ represents an alkyl radical having from 6 to 20 carbon atoms, $R^2$ represents an alkyl radical having from 1 to 5 carbon atoms or hydrogen; n is 1, 2 or 3 and $R^3$ represents an alkenyl or a hydroxyalkyl radical having from 6 to 20 carbon atoms.

It is preferred that the cation of the salts which are used be an alkali metal such as sodium.

Alkali metal alkylsulfates, such as sodium lauryl sulfate, are particularly preferred.

Additional examples of salts which can be used in this invention, are products which are defined as "olefinsulfonates having an alkenyl radical of from 15 to 18 carbon atoms", (manufactured by Farbwerke Hoechst AG), sodium dodecylbenzenesulfonate, sodium hexylsulfonate, sodium dodecylsulfonate, sodium octadecylsulfonate, sodium butyl naphthalenesulfonate, sodium isotridecylsulfonate and sodium dioctylsulfosuccinate.

It is preferable that the salts be used in amounts of from 0.05 to about 20 percent by weight and, more preferably, in amounts of from 2 to 15 percent by weight based on the weight of the caustic lime employed.

The salts can be mixed with the caustic lime before and/or simultaneously with slaking. If the salts are mixed with the caustic lime simultaneously with the slaking operation, then they can be added to the water which is used in emulsifying the organopolysiloxanes before and/or after the emulsification of the organopolysiloxanes.

The hydrophobic agents of this invention are preferably employed in amounts of from 0.1 to 2.0 percent by weight and more preferably, from 0.5 to 1.0 percent by weight based on the dry weight of the compositions which contain or consist of inorganic binding agents.

Examples of compositions which contain or consist of inorganic binding agents to which the hydrophobic agents of this invention can be added are calcium containing compounds (CaO or Ca[OH]$_2$), such as lime mortar and lime dyes, Portland cement, decorative plaster and sodium silicate dyes (Keim). These compositions may contain additives and aggregates, such as sand, vermiculite, perlite, gravel, sawdust, excelsior, asbestos, gluconic acid, calcium gluconate, organic resins such as vinylpolymers, pigments such as oxide dyes and additives to retard curing.

The invention is further illustrated by the following examples in which all parts are by weight unless otherwise specified.

EXAMPLE 1

(a) The products which boil between 100° C. and 150° C. at 760 mm Hg (abs), obtained from the synthesis of methylchlorosilanes according to Rochow by reacting methylchloride with silicon are poured into water. The oily phase thus obtained is emulsified in the same amount of water which contains 1 percent by weight of polyvinyl alcohol containing residual acetyl groups (saponification number, i.e. milligrams of KOH, required to saponify 1 gm of polyvinyl alcohol containing residual acetyl groups, 140; viscosity, as measured in a 4 percent aqueous solution at 20° C., 25 cP)

Fifty parts of the aqueous emulsion thus obtained are mixed with 5 parts of water, 2 parts of sodium lauryl sulfate and 50 parts of powdered caustic lime. A powder having a free water content of 0.75 to 1.1 percent by weight is obtained.

(v1) The method of Example (a) is repeated, except that for comparison purposes sodium lauryl sulfate is omitted.

(b) The method of Example (a) is repeated, except that 2 parts of a product which is identified as "olefinsulfonate having an alkenyl radical of 15 to 18 carbon atoms" (manufactured by Farbwerke Hoechst AG) is substituted for the sodium lauryl sulfate.

(v2) The method of Example (a) is repeated except that for comparison purposes, 2 parts of a non-ionic emulsifier is substituted for the sodium lauryl sulfate. The emulsifier is obtained from nonylphenol and ethylene oxide at a molar ratio of approximately 1:10.

(v3) The method of Example (a) is repeated, except that for comparison purposes 2 parts of a block copolymer having the formula: $HO(C_2H_4O)_x(C_3H_6O)_y(C_2H_4O)_zH$. is substituted for the sodium lauryl sulfate. In the formula the sum of the values for x and z equals 80 percent by weight of $C_2H_4O$-units.

(a1) The method of Example (a) is repeated, except that a mixture consisting of equal parts by weight of methyltrichlorosilane and 2,2,4-trimethylpentyltrichlorosilane is substituted for the products having a high boiling point which is obtained from the reaction of methylchloride with silicon.

(v11) The method of Example (a) is repeated, except that for comparison purposes the sodium lauryl sulfate is omitted.

(b1) The method of Example (a1) is repeated, except that 2 parts of a product which is identified as "olefinsulfonate having an alkenyl radical of 15 to 18 carbon atoms" (manufactured by Farbwerke Hoechst AG) is substituted for sodium lauryl sulfate.

(v12) The method of Example (a1) is repeated, except that for comparison purposes 2 parts of the non-ionic emulsifier which is prepared from nonylphenol and ethylene oxide in a molar ratio of approximately 1:10 is substituted for sodium lauryl sulfate.

(v13) The method of Example (a1) is repeated, except that for comparison purposes 2 parts of a block copolymer having the formula $HO(C_2H_4O)_x(C_3H_6O)_y(C_2H_4O)_zH$. is substituted for sodium lauryl sulfate. In the formula the sum of the values indicated for x and z corresponds to 80 percent by weight of $C_2H_4O$-units.

Samples of powder prepared in accordance with Examples (a), (b), (v2), (V3), (a1), (b1), (V12) and (V13) are scattered on water. After 24 hours the powder prepared in accordance with the methods of Examples (V1) and (V11) are still floating on the surface of the water, while the powders prepared in accordance with the other examples sank shortly after being scattered on the water.

One kg samples of a plaster, each of which contains 2 parts by weight of pure lime (as per DIN No. 1060, June 1952), 1 part by weight of white Portland cement, 8.5 parts by weight of sand having a particle size of no more than 1.5 mm and 0.5 part by weight of red ferrous oxide are first mixed with 5 parts of the powders whose preparation has been described above and then with 250 parts of water. The mixtures thus obtained are placed in glass rings having a diameter of 9 cm and a height of 2 cm which have been placed on a plastic backing and the mixtures are allowed to solidify. After the mixtures have solidified, the glass rings are removed and 12 hours later the discs obtained are removed from the backing, placed on their narrow side and dried for 8 days at room temperature. Finally the dried discs are weighed and placed in water at a temperature of 20° C. so that the water's surface is 5 cm above the top of the discs. Following the various time periods shown in Table 1, the discs are removed from the water and again weighed. The results of these tests are illustrated in Table 1. The column headed "S-value" represents the sum of the water absorption percentages in each horizontal line of the table. The lower the S-value, the lower the water absorption.

TABLE I

| Powder prepared as per example | Water absorption in percentage by weight after | | | | | | | | S-value |
|---|---|---|---|---|---|---|---|---|---|
| | 10 min. | 30 min. | 1 hr. | 2 hr. | 3 hrs. | 5 hrs. | 7 hrs. | 27 hrs. | |
| a) | 0.65 | 0.78 | 0.99 | 1.38 | 2.12 | 5.60 | 11.93 | 12.36 | 35.81 |
| b) | 0.66 | 0.82 | 1.06 | 1.72 | 3.28 | 12.87 | 13.29 | 13.53 | 47.23 |
| v1) | 0.77 | 1.07 | 1.40 | 2.64 | 5.61 | 13.48 | 13.48 | 13.68 | 52.15 |
| v2) | 0.56 | 0.91 | 1.73 | 6.10 | 13.57 | 13.85 | 13.89 | 14.18 | 64.79 |
| v3) | 0.75 | 1.11 | 1.56 | 6.48 | 12.48 | 12.81 | 12.76 | 13.01 | 60.96 |
| a1) | 0.33 | 0.38 | 0.38 | 0.38 | 0.41 | 0.50 | 0.51 | 0.85 | 3.74 |
| b1) | 0.45 | 0.45 | 0.47 | 0.55 | 0.70 | 0.78 | 0.78 | 1.20 | 5.38 |
| v11) | 0.51 | 0.60 | 0.66 | 0.86 | 0.86 | 0.86 | 0.98 | 1.32 | 6.65 |
| v12) | 0.72 | 0.83 | 0.88 | 0.94 | 1.18 | 1.37 | 1.46 | 2.12 | 9.50 |
| v13) | 0.74 | 0.94 | 1.08 | 1.10 | 1.16 | 1.36 | 1.46 | 2.01 | 9.85 |

Table 1 shows that the acid salts of this invention surprisingly increase the water repellency even though they decrease the water's surface tension.

EXAMPLE 2

The methods described in Examples 1(a) (a1), (v1) and (v11), are repeated, except that different amounts of sodium lauryl sulfate are used.

Samples of the powders thus obtained are scattered on water. Only the powders containing 1 part and more of sodium lauryl sulfate per 50 parts of caustic lime sank shortly after being scattered on the water.

Additional samples of the powders are mixed with the plaster and tested in accordance with Example 1. The water absorption is determined on the basis of the time spans indicated in Table 1. The S-values obtained are indicated in Table 2.

TABLE 2

| Powder obtained as per example | Amount of sodium lauryl sulfate per 50 gm CaO | S-value |
|---|---|---|
| v1 | 0 | 54.7 |
| a | 0.5 | 48.6 |
| a | 1.0 | 42.0 |
| a | 2.0 | 33.1 |
| a | 3.0 | 32.7 |
| a | 4.0 | 28.9 |
| a | 5.0 | 26.3 |
| v11 | 0 | 19.4 |
| a1 | 0.5 | 18.7 |
| a1 | 1.0 | 13.5 |
| a1 | 2.0 | 9.7 |
| a1 | 3.0 | 8.1 |
| a1 | 4.0 | 6.6 |
| a1 | 5.0 | 7.0 |

Table 2 illustrates that the degree of water repellency surprisingly increases as the amount of salt employed in accordance with this invention is increased.

The difference between the S-values of Table 2 and those of Table 1, despite identical amounts of sodium lauryl sulfate, are primarily due to different drying conditions of the plaster samples over an 8-day period.

EXAMPLE 3

The methods described in Examples 1 (a), (v1), (a1) and (v11) are repeated except that in Examples 1 (a) and (v1) varying amounts of the emulsion whose preparation is described in Example 1 (a) and the emulsion whose preparation is described in Example 1 (a1) are mixed with 50 parts of the mixtures.

Samples of the powder obtained are scattered on water. The powders containing sodium lauryl sulfate sank shortly after being scattered, while the powders which did not contain sodium lauryl sulfate floated on the surface.

Additional samples of the powders are tested with plaster as described in Example 1 in order to test the samples' water absorbency over various time spans as shown in Table 1. Table 3 lists the S-values observed.

TABLE 3

| Powder prepared as per example | Parts by weight of emulsion prepared as per a) | Parts by weight of emulsion prepared as per a1) | S-value |
|---|---|---|---|
| v1 | 100 | — | 61.3 |
| a | 100 | | 50.0 |
| v1 | 75 | 25 | 36.7 |
| a | 75 | 25 | 24.1 |
| v1 | 50 | 50 | 10.2 |
| a | 50 | 50 | 8.1 |
| v1 | 25 | 75 | 9.6 |
| a | 25 | 75 | 9.2 |
| v11 | 0 | 100 | 8.2 |
| a1 | 0 | 100 | 7.5 |

Table 3 shows that the use of an acid salt of this invention surprisingly results in an increase in water repellency.

Although specific examples have been described herein, it is not intended to limit the invention solely thereto, but to include all the modifications falling within the spirit and scope of the appended claims.

What is claimed is:

1. An improved process for preparing a hydrophobic agent which may be combined with inorganic binding agents prior to molding, said hydrophobic agent being obtained by slaking caustic lime with an organopolysiloxane and water in which at least one mol of water is present for each mol of CaO, the organopolysiloxane in said emulsion having an average of from 0.8 to 1.8 SiC-bonded hydrocarbon radicals selected from the group consisting of alkyl radicals having from 1 to 16 carbon atoms and phenyl in the presence of a protective colloid and thereafter dried, the improvement which comprises adding to the above mixture at least one alkali metal salt of an acid having the formula:

$$R(O)_a SO_3H$$

in which R is a monovalent hydrocarbon radical having up to 50 carbon atoms and which may also contain oxygen and nitrogen atoms and a is 0 or 1.

2. The improved process of claim 1 wherein a is 1.
3. The improved process of claim 1 wherein the salt is an alkali metal alkyl sulfate.
4. The improved process of claim 1 wherein the salt is present in an amount of from 0.05 to 20 percent by weight based on the weight of the caustic lime.
5. The improved process of claim 1 wherein the salt is present in an amount of from 2 to 15 percent by weight based on the weight of the caustic lime.